United States Patent Office 3,634,342
Patented Jan. 11, 1972

3,634,342
DEPOTTABLE POLYURETHANE FOAM
Russell D. Boblitt, Denver, Colo., assignor to Martin Marietta Corporation, New York, N.Y.
No Drawing. Filed Aug. 28, 1967, Ser. No. 663,513
Int. Cl. C08g 22/44, 51/04
U.S. Cl. 260—2.5
9 Claims

ABSTRACT OF THE DISCLOSURE

Rigid polyurethane foams are used to pot electronic components, that is, to protectively encapsulate the components within the foam. A problem exists in subsequent removal of the foam should it be desirable to test or repair these components. The invention concerns the discovery that a small amount of sodium silicate blended with the foam constituents will render the same soluble in an alcohol-water solution.

---

This invention relates to the protective encapsulation or potting of electronic sub-assemblies in polyurethane foam, and more particularly to improvements in the available two and three package blends of polyurethane foam so that the same can be removed or depotted from encapsulated electronic sub-assemblies, and as such, the invention will be sometimes hereinafter referred to as a "depottable polyurethane foam."

The electronic sub-assemblies, such as those used in scientific and military rockets and missiles, are often very complex, delicate and expensive structures which, when unsupported, are completely unable to withstand the severe shocks and vibration to which they may be subjected when they are being used. Accordingly, after an electronic sub-assembly is completed, it is encapsulated or potted in a rigid, protective container where its many delicate parts cannot be displaced or damaged by vibration or shock to the system.

Rigid polyurethane foam has proven to be one of the best of materials for potting electronic components and the like because of the ease with which the foaming-in-place may be accomplished, its structural rigidity, very light weight, resistance to moisture, absence of deterioration and very low thermal conductivity. The manufacturers and suppliers of polyurethane have recognized the importance of this need for the material, and especially, the need for foaming it in place on the job. Accordingly, they have developed and perfected two and three-package systems which are for mixing on the job and which permit an artisan to pot electronic sub-assemblies in a high quality polyurethane foam quickly and at low cost.

One outstanding disadvantage in potting an electronic sub-assembly with polyurethane foam lies in its resistance to chemical action. It is difficult, if not impossible, to remove the polyurethane foam from delicate parts of an electronic sub-assembly which is encapsulated or potted by the foam. While the foam can be dissolved by strong organic solvents, such as methylenechloride, such solvents will also dissolve or deteriorate synthetic resins and coatings forming insulation, printed circuit boards or other structural portions of the encapsulated electronic components.

Accordingly, it is a common practice to replace an entire potted sub-assembly whenever one of the components within the sub-assembly will not function properly. This may be a low-cost, easily replaced element, such as a transistor, even though the sub-assembly may be a very expensive piece of equipment.

There is a real and definite need for an improved method for removing a portion, or all, of the polyurethane foam which encapsulates and pots an electronic sub-assembly to permit inspection, failure analysis or repair of the components making up this sub-assembly. The present invention was discovered and developed with such a need in view, and the invention comprises, in essence, an alteration of the structure of polyurethane foam by the addition of small amounts of an alkali metal silicate, as into the resin-catalyst blend of a two or three-package system, after the base materials are mixed and before foaming commences. It was discovered that the foam was then soluble, or would at least soften in a solution of water and a light type of alcohol. The water-alcohol solution, chemically mild, will not affect the insulation, circuit boards or structural components of the electronic system, but will soften the potting foam to the point where it can be easily removed. The altered foam produced when the alkali metal silicate is added is not significantly different from that normally produced.

It follows that an object of the present invention is to provide a novel and improved polyurethane-type potting foam which may be used to encapsulate or pot an electronic sub-assembly or the like, and which is soluble in a comparatively mild solution of alcohol and water, and so permit the removal of the potting foam to render the sub-assembly or components thereof available for inspection, failure analysis, repair or alteration.

Another object of the present invention is to provide a polyurethane-type foam which is soluble in a mild solvent, such as alcohol and water, but which will, nevertheless, produce a strong, stable matrix capable of effectively potting and protectively encapsulating electronic sub-assemblies and the like.

Another object of the invention is to provide a simple, low cost additive for polyurethane foam producing ingredients which will not significantly affect the basic foam structure, but which will render the foam soluble in an alcohol-water solution.

Another object of the invention is to provide an additive for polyurethane foam producing ingredients to render the resulting foam product soluble in an alcohol-water solution, which may be applied to the foam producing ingredients, such as a conventional two or three-package resin-catalyst blend, without significantly affecting foaming action of the blend during its cure or the basic properties of the finally cured foam.

Further objects of the invention are to provide a novel and improved water-alcohol-soluble polyurethane-type foam for potting purposes or the like, which can be formulated with commercially available ingredients, which is easy to compound and blend and which does not significantly increase the cost of the final product.

With the foregoing and other objects in view, the present invention comprises certain blends, proportions and combinations of ingredients and substances as hereinafter described and defined in the claims appended hereto.

Urethane foams are basically the reaction products of a polyol and polyisocyanate made to rise, or foam, by a blowing agent. The polyols most commonly used are polyethers and polyesters. The polyisocyanate most commonly used is the 80/20 isomer of toluene diisocyanate. Catalysts and emulsifiers are also required and the choice of a catalyst and emulsifier will determine, to a large extent, the rate of reaction of polymerization and characteristics of the resultant foam. The blowing agent may be carbon dioxide gas generated in situ by the reaction of water and a calculated excess of isocyanate in the mixture with the other components. Also, other blowing agents, such as fluorinated hydrocarbons, may be used.

The urethane foams can be advantageously formulated to provide two or three-component or package systems which can be used, as needed and on a custom basis, through the simple expedient of mixing the components together. Each component or package will have a substantial shelf life, one component will contain the resins in some proportion as to remain fluid, while another component will contain the catalyst and other activating agents. When the two or three components are interblended, in correct proportions, the foaming and curing occurs. A commercial, two-component, rigid polyurethane foam of the polyester type known as Chempol No. 30–1625, manufactured by the Freeman Chemical Corporation of Port Washington, Wis., was used in the sample herein described to exemplify the present invention, and the same has been used in numerous actual potting applications. The actual proportions of these materials have been established by the manufacture for Chempol No. 30–1625 and is substantially 100 parts, by weight of resin, to 85.5 parts, by weight of catalyst. However, it is to be realized that such a proportion is not necessarily the same for any other competitive, commercial, two-component package to produce substantially the same final result.

This Chempol No. 30–1625 polyurethane foam, characteristic and exemplary of the commercial types available, is insoluble in a number of fluids, including water and alcohol. It can be dissolved by stronger solvents, such as methylene chloride, and when the foam is set to encapsulate an electronic sub-assembly, it is difficult, if not impossible, to remove the same without damaging the components of the sub-assembly.

In practice of the present invention, a small proportion of sodium or potassium silicate is used to alter the characteristics of the polyurethane foam to render it susceptible to the effects of a water-alcohol solution. Certain silicon compounds have heretofore been used in the preparation of polyurethanes and U.S. Pat. No. 3,227,666 discloses the use of an aluminum silicate filler. However, such prior uses of silicates are more concerned with the stability of the foam and do not consider the use of any such material to alter the solubility characteristics of the foam. The manner in which the foam is altered cannot be explained, because the final product, the rigid foam, is otherwise substantially the same as that formed without the alkali-metal silicate additive as if the additive were an inert filler.

An example of the formulation of a polyurethane foam, according to the invention, is as follows:

Using the selected commercial two-component blend, the Chempol No. 30–1625, 100 parts by weight of the resin, and 85.5 parts by weight of the catalyst, were placed into a mixing container. Then, 4.5 parts by weight of sodium silicate ($Na_2SiO_3$), in concentrated liquid form, was added to the mix (2.43 percent by weight of the resin-catalyst blend). The mixture was then blended by stirring, and applied to a pot container for foam potting and curing, the cure being by heating the pot containers to a temperature of 150 degrees F. for two hours, the conventional procedure for the material at hand.

The resulting foamed pot appeared to be substantially identical to foamed pots made without the addition of the sodium silicate; thus, the pot was permitted to age sufficiently so that all reactions were fully complete, as for a time period of more than one week. It was then immersed in a solution of 50 percent ethyl alcohol and 50 percent water and the solution was warmed to a temperature of approximately 160 degrees F. for approximately 15 minutes. The foamed pot, then removed from the solution, had a thick layer of softened foam at its exposed surfaces which could be easily removed and picked from place without disturbing any delicate wires or electrical components which were within it. The repetition of the soaking in the warm alcohol-water solution softened another thick layer of exposed foam which was then removed, while further soakings in the warm alcohol-water solution permitted all foam to be removed.

As a second example, another two-component commercial blend, a urethane foam of a polyester type, known to the trade as Duo-Foam, Plasterx resins, provided by Plasticrafts, Inc. of Denver, Colo., was modified by the use of sodium silicate. The components, 100 parts by weight of resin and 140 parts by weight of catalyst, were placed into a mixing container. Then, 4.5 parts by weight of sodium silicate, in concentrated liquid form, was added to the mix (1.84 percent by weight of the resin-catalyst blend). The mixture was blended by stirring and applied to a pot container for foam potting and curing. The cure with this material being at room temperature was complete in approximately three hours.

The resulting foamed pot of Duo-Foam, though of a lower density than the Chempol material heretofore described, appeared to be substantially identical to a foamed pot of Duo-Foam made without the addition of the sodium silicate. As in the first example, the Chempol material, this foamed pot formed with Duo-Foam was immersed in a solution of 50 percent ethyl-alcohol and 50 percent water, and the solution was warmed to a temperature of approximately 160 degrees F. for approximately fifteen minutes. The foamed pot, when removed from the solution, had a thick layer of softened foam at its exposed surfaces which was easily removed.

Various tests were then made to establish reasonable variations and limitations of the modified foam. First, it was established that potassium silicate, which in appearance was nearly identical to sodium silicate, would function the same as sodium silicate, suggesting that, as a class, the silicates of the alkali metals will function the same, athough it would seem that silicates of lithium, rubidium or cesium would be too expensive to be practical.

When the proportion of sodium silicate was varied, as with diminishing amounts of sodium silicate, the time required for the subsequent softening action in the alcohol-water solution was increased. When the amount of sodium silicate was reduced to approximately 0.5 percent of the resin-catalyst blend, the time required to effect any appreciable softening of exposed surfaces of the foam was excessive. With greater amounts of sodium silicate, significantly in excess of the preferred amount (2.43 percent) above set forth, the sodium silicate began to play a part in the basic reaction, and the foaming action was accelerated. With amounts exceeding approximately 5.0 percent sodium silicate, the action was too rapid to control.

Other alcohols were tested for the alcohol-water solution and it was found that any light alcohol, such as isopropyl, ethyl or methyl alcohol would function satisfactorily. Also, it was determined that with any of the above mentioned alcohols, if less than approximately 10 percent or more than 80 percent alcohol was used in the solution with water, the softening of the foam would be too slow to be of value. The optimum proportions for rapid softening of the foam was the 50 percent alcohol–50 percent water solution.

I have now described my invention and an operative example of the same in sufficient detail as to permit others skilled in the art to practice this invention. However, it is obvious that equivalent constructions and variations exist which are within the spirit and scope of the invention.

I claim:

1. A softenable polyurethane foam comprising a blown and cured reaction product of an organic polyisocyanate and polyol and including as a component thereof at least about 0.5 percent by weight of alkali metal silicate to render the foam susceptible to softening by an alcohol-water solution containing at least 10 percent of a low molecular weight aliphatic alcohol.

2. The polyurethane foam defined in claim 1, wherein the alkali metal silicate is present in more than about 0.5 percent, and less than about 5.0 percent, by weight, of the foam.

3. The polyurethane foam of claim 1, wherein the polyol is a polyester.

4. In the method for the formation of a rigid polyurethane foam by reacting components which include an organic isocyanate and a polyol in the presence of catalysts and blowing agents, the improvement consisting of the addition of not less than about 0.5 percent nor more than about 5 percent by weight of an alkali metal silicate whereby to render the final foam reaction product softenable in an alcohol-water solution of isopropyl, methyl and ethyl alcohols and mixtures thereof.

5. A method for forming a hard softenable polyurethane foam matrix into a container by blending an isocyanate, a polyol, catalysts and blowing agents, as resin and catalyst components, and subsequently, softening the foam matrix in an alcohol-water solution to permit it to be removed from the container, said process including the steps of:
 (a) blending the separately packaged resin and catalyst components in proportions proper to cause the blend to foam and cure,
 (b) blending a small amount, more than 0.5 percent and less than 5 percent, of sodium silicate with the resin-catalyst blend before foaming and curing commences,
 (c) containing the blend for a time period sufficient to complete foaming and curing to a rigid foam, and
 (d) immersing the cured foam in an alcohol-water solution having more than 10 percent and less than 80 percent alcohol, for a time period sufficient to effect softening of the blend.

6. The method defined in claim 5, wherein the alcohol is a light alcohol selected from the group consisting of ethyl, methyl and isopropyl alcohols.

7. The method defined in claim 5, wherein said cured foam is immersed for a time period sufficient to soften a layer of exposed foam, and the further steps of: removing the layer of foam and again immersing the cured foam in an alcohol-water solution for a time period sufficient to soften another layer of exposed foam.

8. The method defined in claim 5, wherein the alcohol-water solution is heated to a temperature on the order of about 150 degrees F.

9. A polyurethane foam comprising a blown and cured combination of polyisocyanate, polyol and an alkali-metal silicate which is not less than 0.5 percent nor more than 5 percent, by weight of the final foamed product.

References Cited

UNITED STATES PATENTS

| | | | |
|---|---|---|---|
| 2,788,335 | 4/1957 | Barthel | 260—2.5 |
| 3,224,899 | 12/1965 | Wilson | 117—98 |
| 3,404,103 | 10/1968 | Matsudaira et al. | 260—2.3 |
| 3,227,666 | 1/1966 | Showalter | 260—2.5 |

FOREIGN PATENTS

| | | | |
|---|---|---|---|
| 1,078,317 | 8/1967 | Great Britain | 260—2.5 |
| 1,118,966 | 12/1961 | Germany | 260—2.5 |

DONALD E. CZAJA, Primary Examiner

H. S. COCKERAM, Assistant Examiner

U.S. Cl. X.R.

260— 75, 77.5, 37